United States Patent
Robbins

(10) Patent No.: US 10,718,433 B2
(45) Date of Patent: Jul. 21, 2020

(54) WEAR RING FOR DIE-CASTING PISTON, AND DIE-CASTING PISTON INCORPORATING SAME

(71) Applicant: Paul Henry Robbins, Markham (CA)

(72) Inventor: Paul Henry Robbins, Markham (CA)

(73) Assignee: Exco Technologies Limited, Markham, Ontario (CA)

( * ) Notice: Subject to any disclaimer, the term of this patent is extended or adjusted under 35 U.S.C. 154(b) by 347 days.

(21) Appl. No.: 15/959,491

(22) Filed: Apr. 23, 2018

(65) Prior Publication Data
US 2018/0320789 A1 Nov. 8, 2018

Related U.S. Application Data

(60) Provisional application No. 62/501,867, filed on May 5, 2017.

(51) Int. Cl.
*B22D 17/20* (2006.01)
*F16J 9/20* (2006.01)

(52) U.S. Cl.
CPC .............. *F16J 9/20* (2013.01); *B22D 17/203* (2013.01)

(58) Field of Classification Search
CPC .......... B22D 17/203; B29C 45/53; F16J 9/20
See application file for complete search history.

(56) References Cited

U.S. PATENT DOCUMENTS

| 1,930,857 A * | 10/1933 | Morton ............... B23C 3/22 29/888.076 |
| 2015/0107796 A1* | 4/2015 | Robbins ............... F16J 9/14 164/254 |
| 2016/0038998 A1* | 2/2016 | Murselaj ............ B22D 17/203 164/312 |

FOREIGN PATENT DOCUMENTS

EP          0901852 A1 *  3/1999  .......... B22D 17/203

* cited by examiner

*Primary Examiner* — Kevin E Yoon
(74) *Attorney, Agent, or Firm* — Marks & Clerk

(57) ABSTRACT

A wear ring for a piston of a die-casting apparatus comprises an annular body having a gap extending therethrough, the gap being configured to define at least two circumferentially offset pairs of circumferentially spaced apart facing surfaces. The annular body comprises an axial end face having at least one arc-shaped recess formed therein.

20 Claims, 16 Drawing Sheets

WEAR RING FOR DIE-CASTING PISTON, AND DIE-CASTING PISTON INCORPORATING SAME

CROSS-REFERENCE TO RELATED APPLICATION

This application claims the benefit of U.S. Application No. 62/501,867 filed on May 5, 2017, the content of which is incorporated herein by reference in its entirety.

FIELD OF THE INVENTION

The subject disclosure relates generally to die-casting and in particular, to a wear ring for a die-casting piston, and a die-casting piston incorporating the same.

BACKGROUND OF THE INVENTION

In the field of automotive manufacturing, structural components that historically have been fabricated of steel, such as engine cradles, are increasingly being replaced with aluminum alloy castings. Such castings are typically large, convoluted, and relatively thin, and are required to meet the high quality standards of automotive manufacturing. In order to meet these requirements, vacuum-assisted die-casting is typically used to produce such castings.

Vacuum-assisted die-casting machines comprise a piston, sometimes referred to as a "plunger", that is advanced through a piston bore, sometimes referred to as a "shot sleeve", to push a volume of liquid metal into a mold cavity. Vacuum is applied to the piston bore to assist the flow of the liquid metal therethrough. A replaceable wear ring is fitted onto the piston, and makes continuous contact with the inside of the piston bore along the full stroke of the piston for providing a seal for both the vacuum and liquid metal. The wear ring sits freely on a circumferential rib rearward of the front face of the piston tip, and is split to allow it to be installed onto the piston tip prior to use, and to be removed from the piston tip after use.

For example, FIG. 1 shows a portion of a prior art vacuum-assisted die-casting apparatus, which is generally indicated by reference numeral 20. Vacuum-assisted die-casting apparatus 20 comprises a piston that is moveable within a piston bore 22 for pushing a volume of liquid metal (not shown) into a die-casting mold cavity (not shown) to form a casting. In the example shown, the piston is positioned at its starting position of the stroke, which is rearward of a port 24 through which the volume of liquid metal is introduced into the piston bore 22.

The piston comprises a piston tip 30 mounted on a forward end of a piston stem (not shown). The piston tip 30 has a front face 32 that is configured to contact the volume of liquid metal introduced into the piston bore 22 via port 24. The piston tip 30 has a circumferential rib 34 formed on an outer surface thereof adjacent the front face 32, and an upper bore 36 formed in a top surface thereof for receiving a removable retainer pin 38. The piston tip 30 has a wear ring 40 disposed on an outer surface thereof.

The wear ring 40 may be better seen in FIG. 2. The wear ring 40 consists of a body having a generally annular shape, and comprises an inner circumferential groove 42 that is shaped to receive the circumferential rib 34 of the piston tip 30. The wear ring 40 also comprises a gap 44 for enabling the wear ring 40 to be expanded as needed during installation onto, and removal from, the piston tip 30. The wear ring 40 further comprises a semi-cylindrical notch 48 machined therein at a diametrically opposite position from the gap 44, and which is shaped for accommodating the removable retainer pin 38.

During use, the wear ring 40 is installed onto the piston tip 30 by first inserting the retainer pin 38 into the upper bore 36, and then circumferentially expanding the wear ring 40 and fitting the inner circumferential groove 42 onto the circumferential rib 34 of the piston tip with the semi-cylindrical notch 48 aligned with the retainer pin 38. Once installed, the wear ring 40 is locked in rotational position relative to the piston tip 30, with the gap 44 being positioned at the underside of the piston tip 30, as may be seen in FIG. 1. The piston having the piston tip 30 with the wear ring 40 installed thereon is then inserted into the piston bore 22 of the die-casting apparatus.

At the beginning of a stroke cycle, the piston is positioned at its starting position in the piston bore 22, and a volume of liquid metal is introduced into the piston bore 22 forward of the piston tip 30 via port 24. The piston is then moved forward through the piston bore 22 to push the volume of liquid metal into the mold cavity for forming a metal casting, and is then moved rearward to its starting position to complete the stroke cycle. During this movement, the wear ring 40 disposed on the piston tip 30 continuously contacts the inner surface of the piston bore 22, and provides a liquid metal seal for preventing liquid metal from passing between the piston tip 30 and the inner surface of the piston bore 22. The wear ring 40 also provides a vacuum seal for maintaining vacuum (that is, a low pressure) within the forward volume of the piston bore 22. The cycle is repeated, as desired, to produce multiple metal castings.

Other die-casting pistons comprising wear rings have been described. For example, U.S. Pat. No. 5,048,592 to Mueller describes a plunger for forcing molten aluminum or brass out of a casting cylinder of a die-casting machine. The plunger includes a cap that is screwed via an internal thread onto an external thread of a supporting body and is made of a material, in particular a copper alloy, which has a greater coefficient of thermal expansion than the material of the cylinder, in particular steel, and the material of the supporting body, in particular steel. In one embodiment, the cap has on its outer cover face a cylindrical extension with an outer annular web, which engages into a corresponding inner annular groove of a sealing ring. The sealing ring is split radially in a step shape.

U.S. Pat. No. 7,900,552 to Schivalocchi et al. describes a piston for a cold chamber die-casting machine comprising a body and at least one sealing band mounted around the body. The body and the band are provided with coupling means for obtaining both an angular locking and an axial locking of the band to the piston body.

U.S. Pat. No. 8,136,574 to Müller et al. describes a multi-piece piston for fixing to a high pressure side end of a piston rod running axially in a casting cylinder of a cold chamber casting machine. The piston comprises a piston crown forming a piston front face on the high pressure side and a piston body in the form of a bush connected to the piston crown on the low pressure side. Complementary bayonet locking means are provided for axial fixing of the piston to the end of the piston rod, on the piston crown and the end. In one embodiment, the piston carries recessed wear rings on its outer circumference.

U.S. Pat. No. 9,587,742 to Robbins describes a wear ring for a piston of a die-casting apparatus that comprises an annular body having a gap extending therethrough. The gap is configured to define at least two circumferentially offset pairs of circumferentially spaced apart facing surfaces. The facing surfaces of each pair are angled and configured to contact each other in a flush manner when the wear ring is circumferentially compressed.

It is an object at least to provide a novel wear ring for a die-casting piston, and a die-casting piston incorporating the same.

SUMMARY OF THE INVENTION

Accordingly, in one aspect there is provided a wear ring for a piston of a die-casting apparatus, the wear ring comprising: an annular body having a gap extending therethrough, the gap being configured to define at least two circumferentially offset pairs of circumferentially spaced apart facing surfaces, the annular body comprising an axial end face having at least one arc-shaped recess formed therein.

The at least one recess may have a center that is circumferentially offset from a diametrical line that bisects the gap between one of the pairs of facing surfaces. The center of the at least one recess may be circumferentially offset from the diametrical line by an angle of between about 10 degrees and about 90 degrees. The center of the at least one recess may be circumferentially offset from the diametrical line by an angle of between about 30 degrees and about 60 degrees. The center of the at least one recess may be circumferentially offset from the diametrical line by an angle of about 45 degrees.

The at least one recess may have an arc length and a width, the arc length being greater than the width.

The at least one recess may have an arc length that subtends an angle, at the center of the wear ring, of between about 10 and about 50 degrees. The at least one recess may have an arc length that subtends an angle, at the center of the wear ring, of between about 20 and about 40 degrees. The at least one recess may have an arc length that subtends an angle, at the center of the wear ring, of about 30 degrees.

The at least one recess may have a longitudinal opening along an inner side.

One of the facing surfaces of each pair may be parallel to a diametrical line that bisects the gap between one of the pairs of facing surfaces.

Both of the facing surfaces of each pair may be parallel to a diametrical line that bisects the gap between one of the pairs of facing surfaces.

The gap between a first pair of facing surfaces may be laterally offset by a distance from a diametrical line that bisects the gap between a second pair of facing surfaces. The distance may be substantially equal to the gap between the second pair of facing surfaces, when the wear ring is in an uncompressed state.

Both of the facing surfaces of each pair may extend in an axial direction of the wear ring.

The gap may comprise a first portion and a second portion defining the at least two circumferentially offset pairs of circumferentially spaced apart facing surfaces, and wherein the gap further comprises an intermediate portion extending generally in the circumferential direction and joining the first portion and the second portion. The intermediate portion may define a pair of additional facing surfaces, each of the additional facing surfaces being inclined and defining an angle with a radial line touching the intermediate portion, where the angle may be between about 5 and about 40 degrees. The intermediate portion may define a pair of additional facing surfaces, each of the additional facing surfaces defining an angle with a line that is tangential to the circumference of the wear ring, where the angle may be between about 0.1 and 10 degrees.

The wear ring may further comprise at least one feature on the annular body configured to engage the piston. The at least one feature may be one of at least one projection and at least one inner circumferential groove.

In another aspect, there is provided a piston of a die-casting apparatus, the piston comprising: a piston tip configured to push liquid metal through a piston bore; and a wear ring disposed on an outer surface of the piston tip, the wear ring comprising an annular body having a gap extending therethrough, the gap being configured to define at least two circumferentially offset pairs of circumferentially spaced apart facing surfaces, the annular body comprising an axial end face having at least one arc-shaped recess formed therein.

The at least one recess may be configured to accommodate a projection extending from the piston tip. The projection may be a retainer pin.

In one embodiment, there is provided a die-casting apparatus comprising the piston. The die-casting apparatus may be a vacuum-assisted die-casting apparatus.

BRIEF DESCRIPTION OF THE DRAWINGS

Embodiments will now be described more fully with reference to the accompanying drawings in which.

DETAILED DESCRIPTION OF THE EMBODIMENTS

Figure 1:
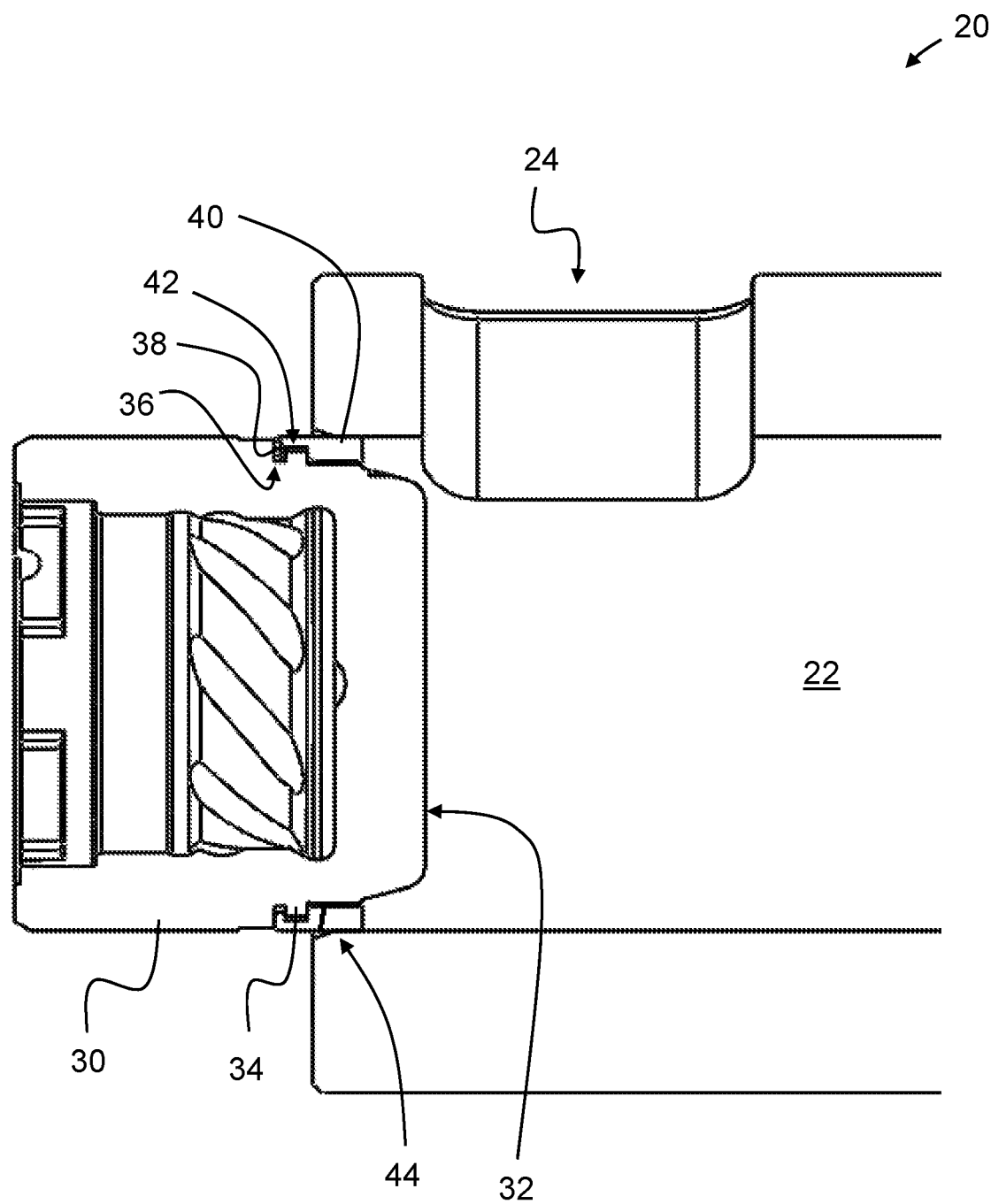
FIG. 1 is a side sectional view of a portion of a prior art die-casting apparatus, comprising a piston having a piston tip with a prior art wear ring mounted thereon.
Figure 2:
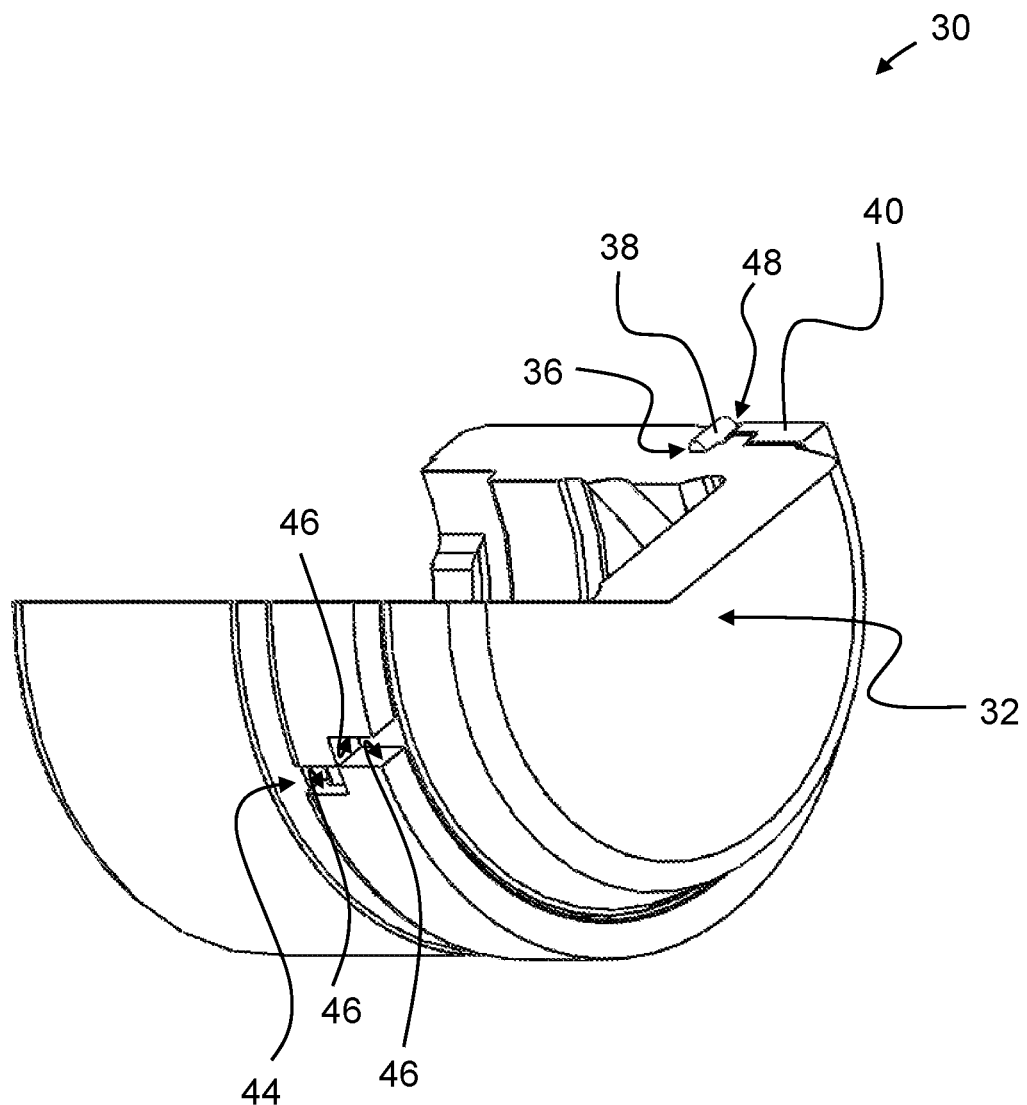
FIG. 2 is a sectional view of the piston tip and wear ring of FIG. 1.
Figure 3:
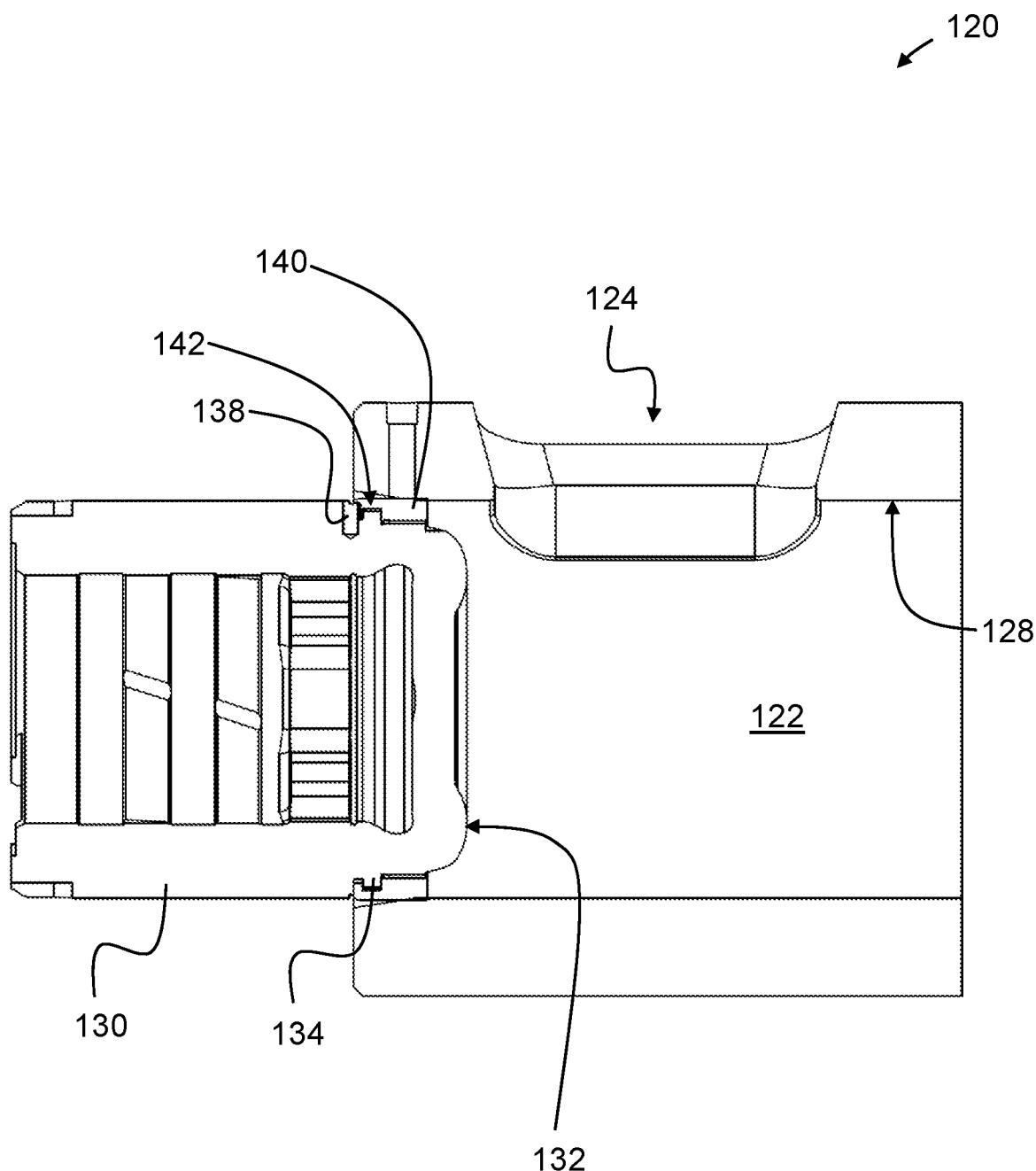
FIG. 3 is a side sectional view of a portion of a die-casting apparatus, comprising a piston having a piston tip with a wear ring mounted thereon.
Figure 4:
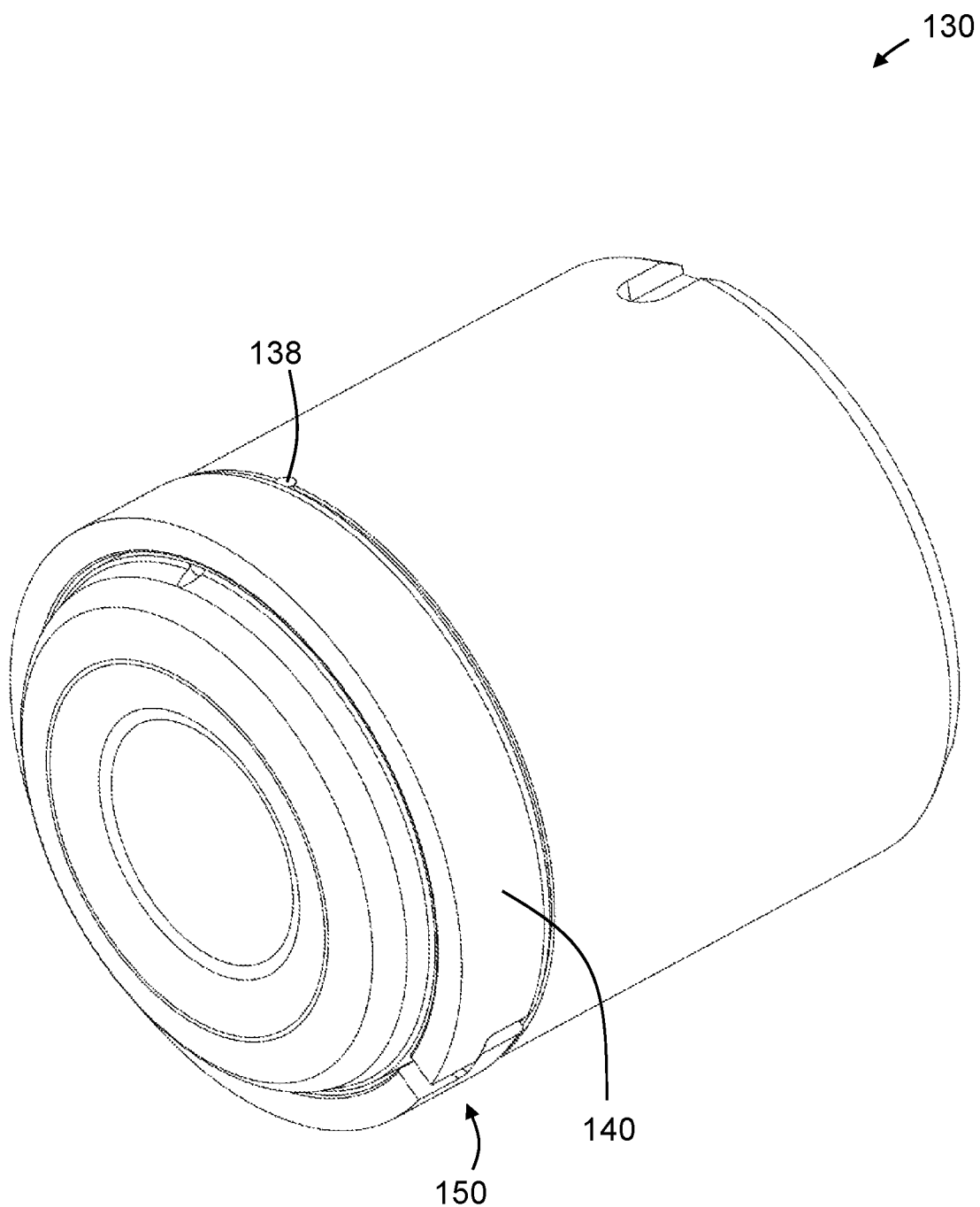
FIG. 4 is a perspective view of the piston tip and the wear ring of FIG. 3.
Figure 5:
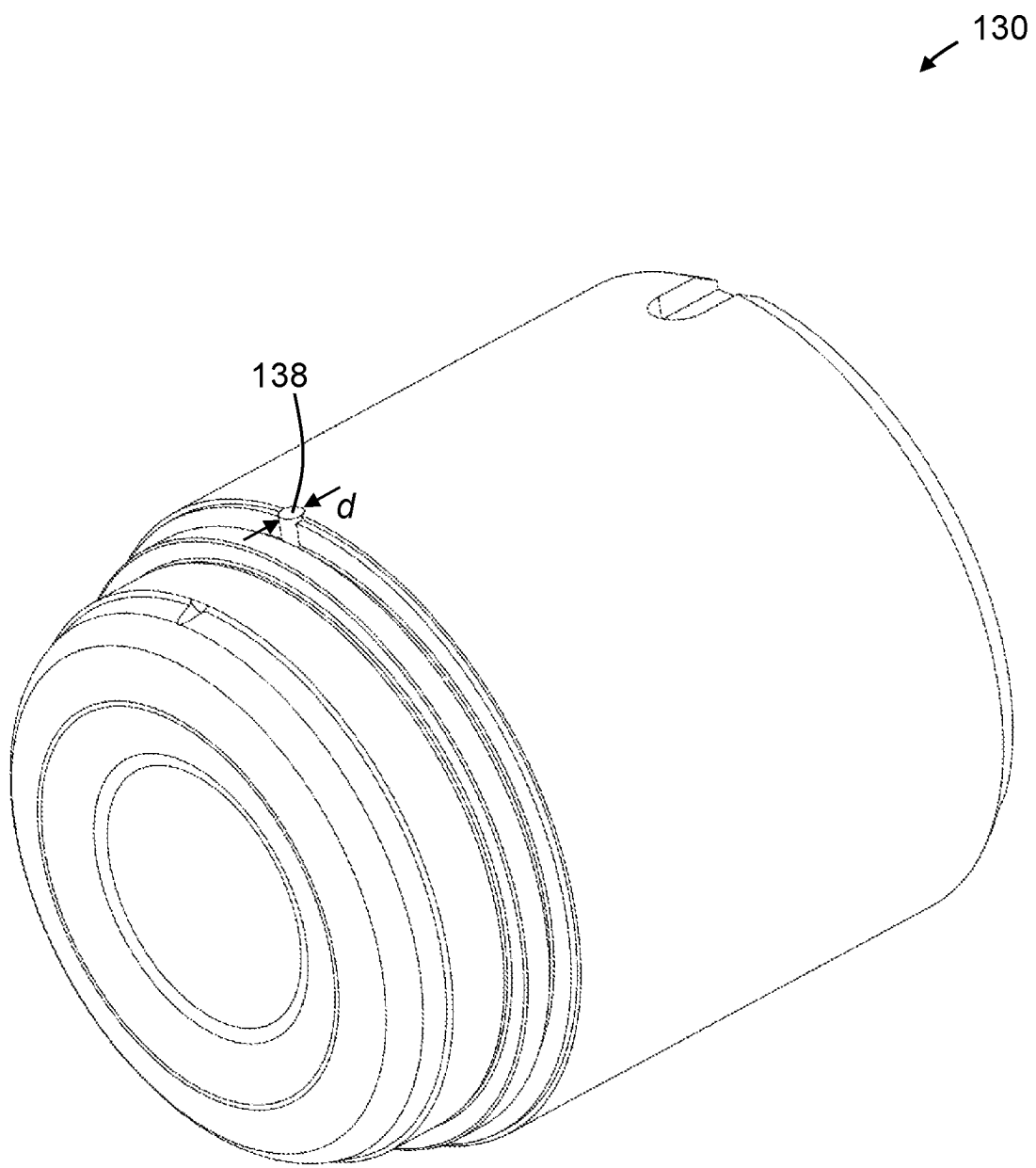
FIG. 5 is a perspective view of the piston tip of FIG. 3.
Figure 6:
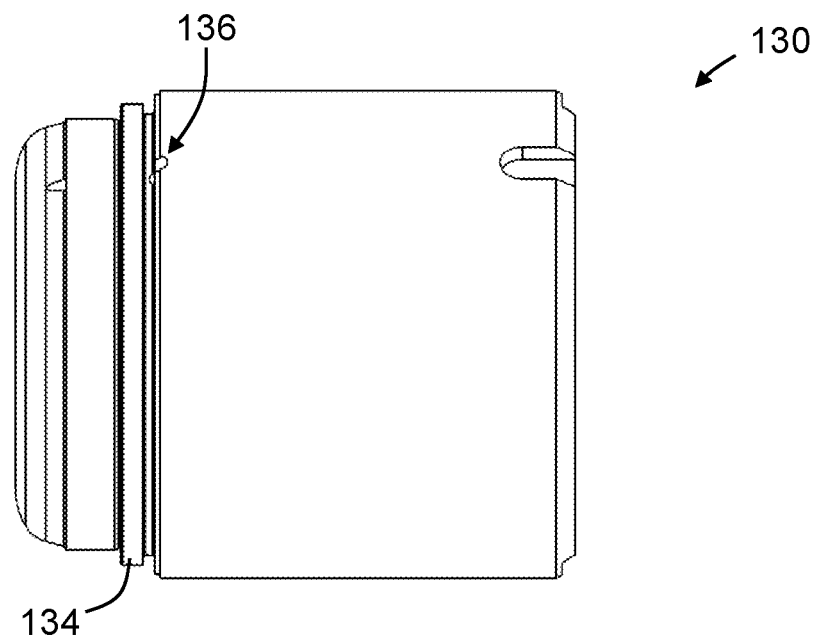
FIG. 6 is a side view of the piston tip of FIG. 3.
Figure 7:
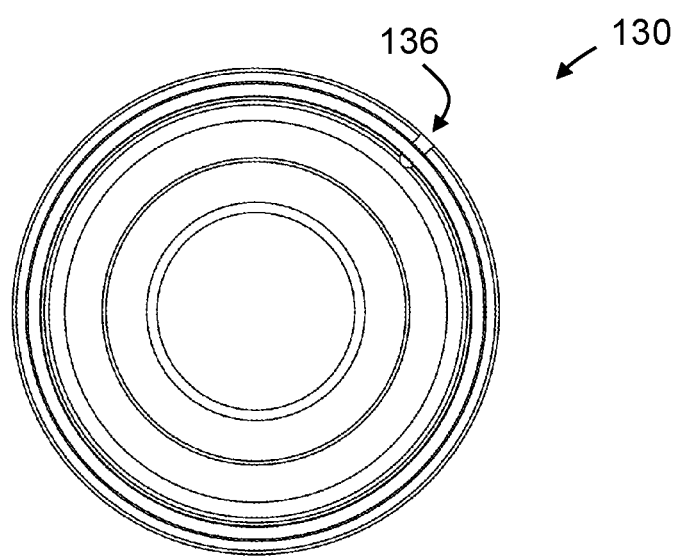
FIG. 7 is a front view of the piston tip of FIG. 3.
Figure 8:
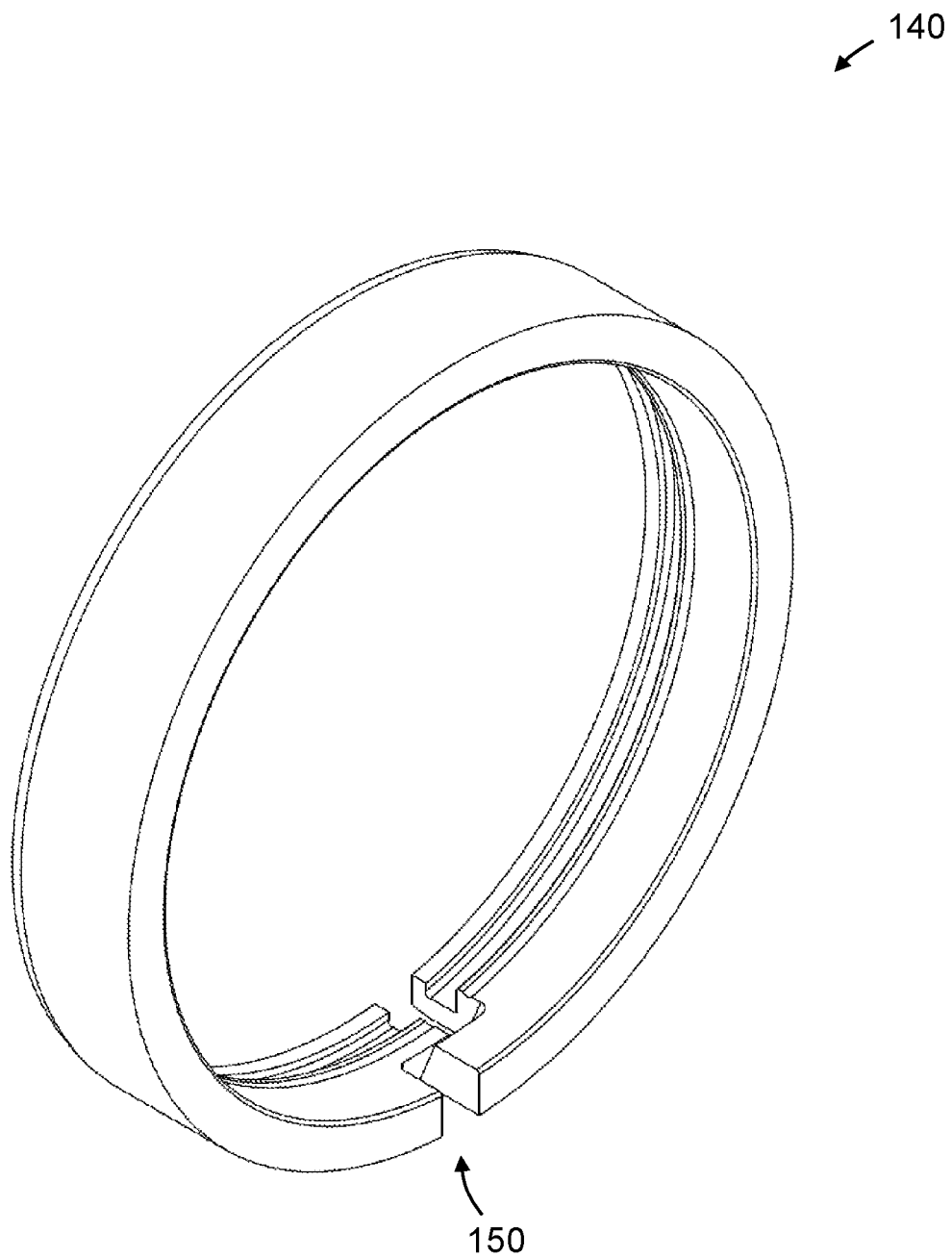
FIG. 8 is a front perspective view of the wear ring of FIG. 3.
Figure 9:
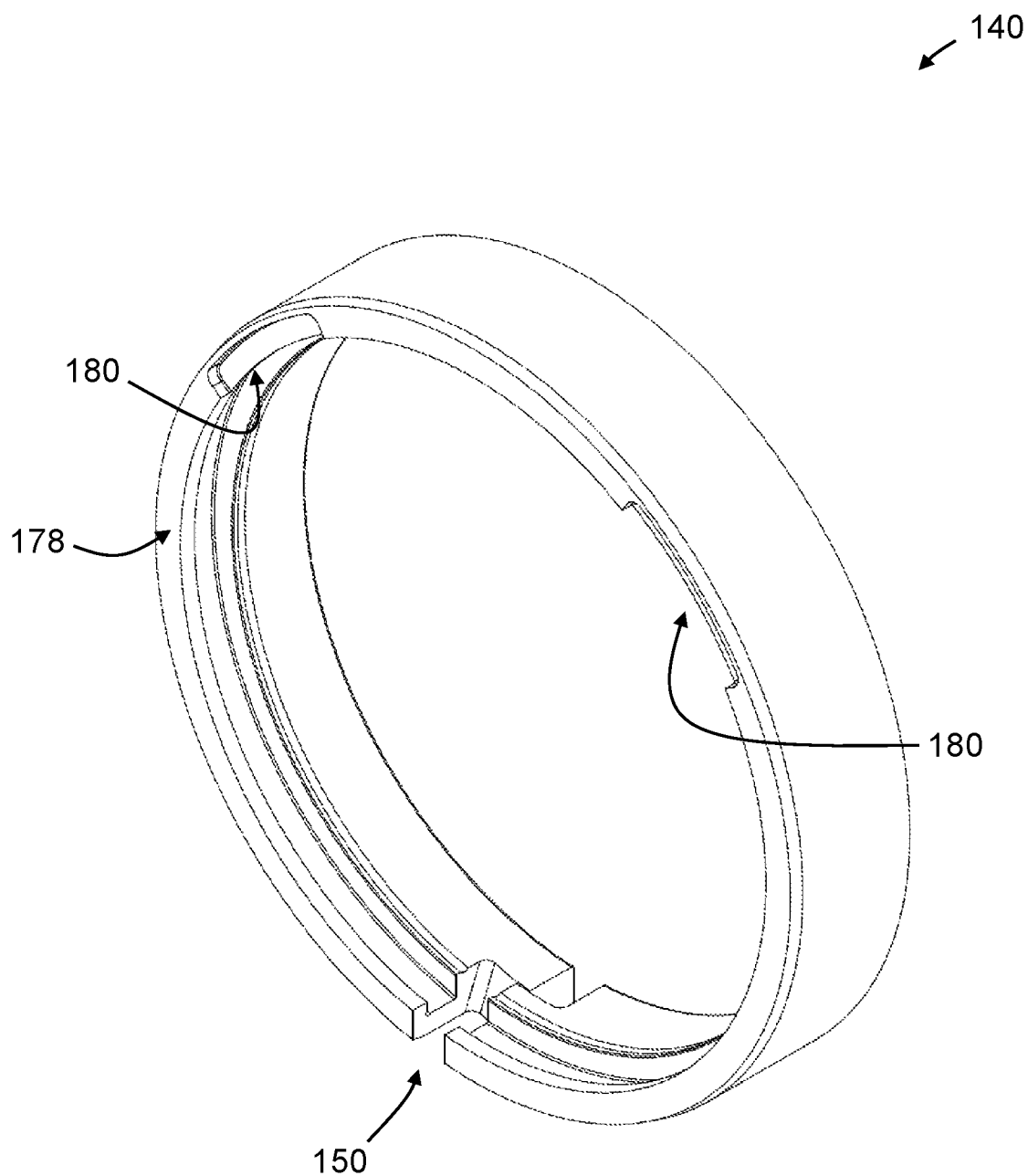
FIG. 9 is a rear perspective view of the wear ring of FIG. 3.
Figure 10:
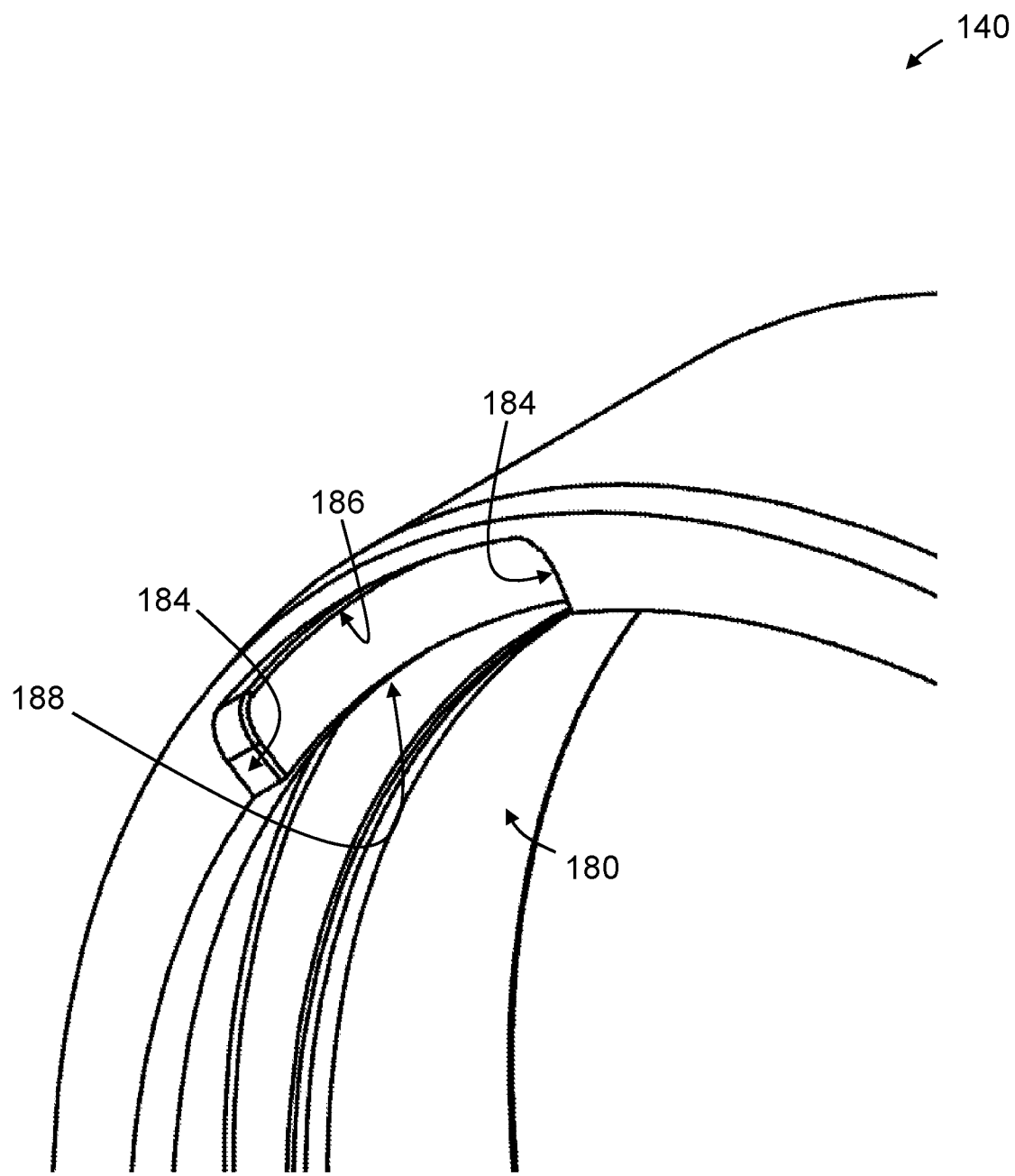
FIG. 10 is an enlarged view of a portion of the wear ring of FIG. 9.
Figure 11:
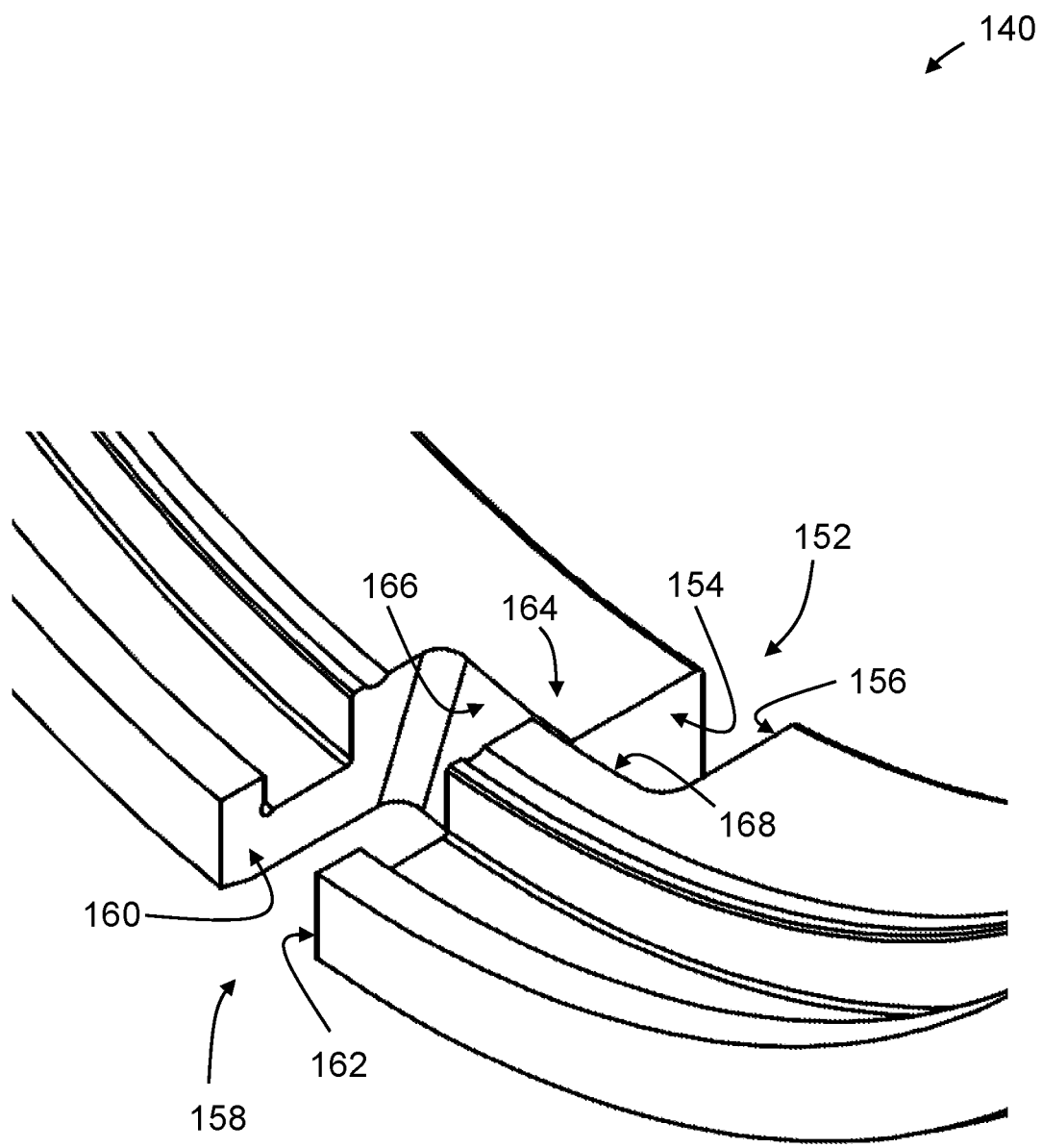
FIG. 11 is an enlarged view of another portion of the wear ring of FIG. 9.
Figure 12:
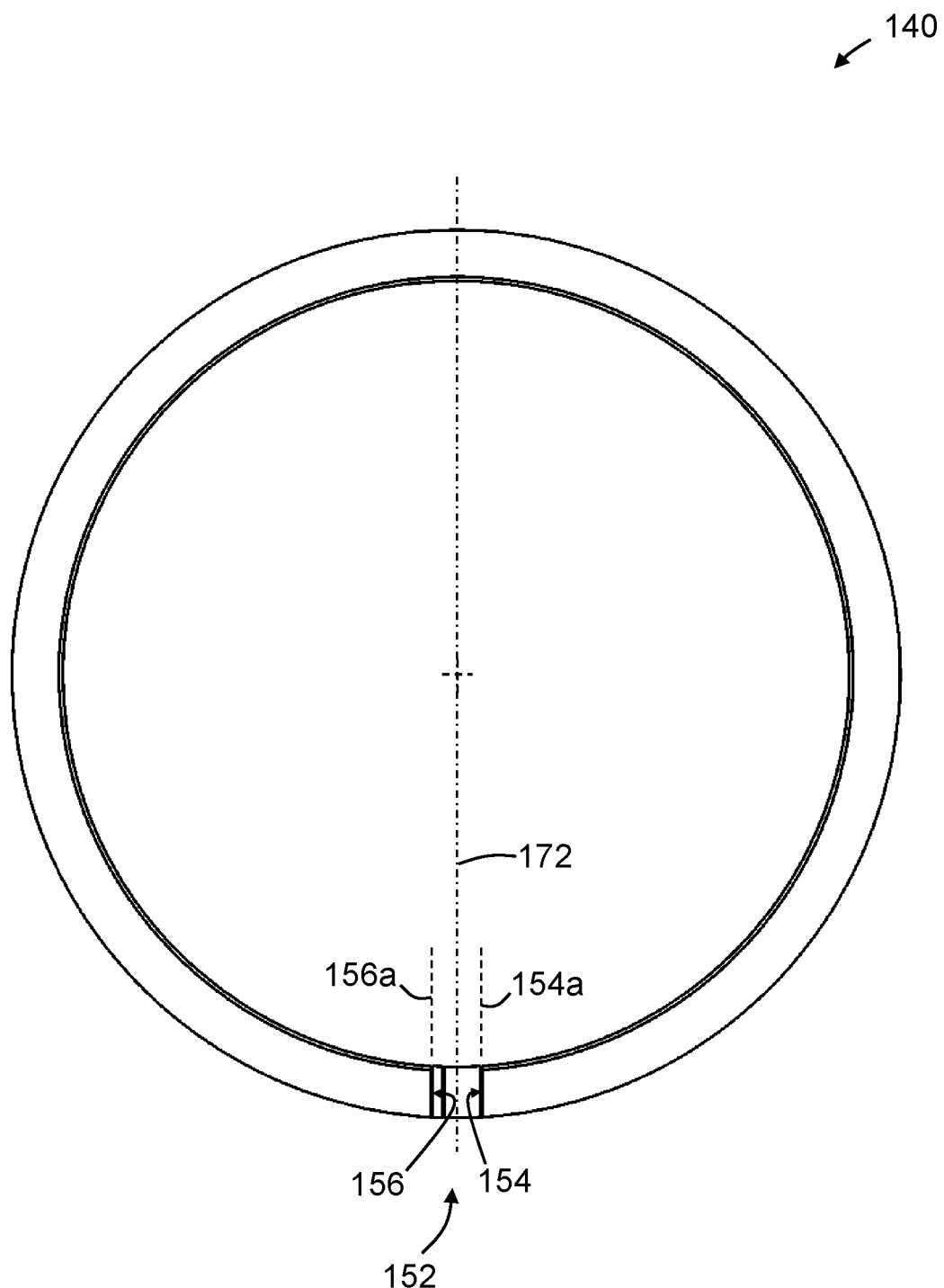
FIG. 12 is a front view of the wear ring of FIG. 3.

Turning now to FIGS. 3 to 7, a portion of a vacuum-assisted die-casting apparatus is shown, and is generally indicated by reference numeral 120. Vacuum-assisted die-casting apparatus 120 comprises a piston that is moveable within a piston bore 122 for pushing a volume of liquid metal (not shown) into a die-casting mold cavity (not shown) to form a casting. In the example shown, the piston is positioned at its starting position of the stroke, which is rearward of a port 124 through which the volume of liquid metal is introduced into the piston bore 122.

The piston comprises a piston tip 130 mounted on a forward end of a piston stem (not shown). The piston tip 130 has a front face 132 that is configured to contact the volume of liquid metal introduced into the piston bore 122 via port 124, and in the example shown the front face 132 comprises a recessed area. The piston tip 130 has a circumferential rib 134 formed on an outer surface thereof rearward of the front face 132. The piston tip 130 also has an upper bore 136 located rearward of the circumferential rib 134 for receiving a removable retainer pin 138. A replaceable wear ring 140 is disposed on the circumferential rib 134 against the retainer pin 138.

The wear ring 140 may be better seen in FIGS. 8 to 17. Wear ring 140 comprises a body having a generally annular shape and is fabricated of a resilient material. In this embodiment, the wear ring 140 is fabricated of DIN 1.2344 grade steel. The wear ring 140 comprises an inner circumferential groove 142 that is shaped to receive the circumferential rib 134 of the piston tip 130. The wear ring 140 also comprises a circumferential groove 144 that is configured to trap liquid metal passing between the wear ring 140 and the piston tip 130 during operation. The wear ring 140 further comprises a rear beveled surface 146 for facilitating rearward movement of the piston through the piston bore during operation.

The wear ring 140 also comprises a gap 150 for facilitating installation and removal of the wear ring 140 onto and from the piston tip 130. The gap 150 does not extend straight through the wear ring, but rather comprises two or more circumferentially offset pairs of circumferentially spaced apart facing surfaces that are joined together by at least one step or jog. As will be understood, the gap 150 enables the wear ring 140 to expand and contract as needed during operation of the piston.

The gap 150 is formed by cutting an otherwise continuous ring. In this embodiment, the gap 150 is formed by electronic discharge machining (EDM). The gap 150 comprises a first portion 152 extending in the axial direction and defining circumferentially spaced apart facing surfaces 154 and 156, a second portion 158 extending in the axial direction and defining circumferentially spaced apart facing surfaces 160 and 162, and an intermediate portion 164 extending generally in the circumferential direction and joining the first portion 152 and the second portion 158, and defining facing surfaces 166 and 168. As may be seen in FIG. 11, the first and second portions 152 and 158 are circumferentially offset.

In this embodiment, the first portion 152 of the gap 150 is machined using parallel cutting. As a result, when the wear ring 140 is in an uncompressed state, the facing surfaces 154 and 156 are parallel, such that each of the facing surfaces 154 and 156 defines a respective plane 154a and 156a that is parallel with a diametrical line 172 passing through the center of the wear ring 140. The diametrical line 172 bisects the gap between the facing surfaces 154 and 156. In this embodiment, the second portion 158 of the gap 150 is also machined using parallel cutting and, as a result, when the wear ring 140 is in the uncompressed state, each of the facing surfaces 160 and 162 defines a respective plane 160a and 162a that is parallel with the diametrical line 172. The gap between the facing surfaces 160 and 162 is laterally offset from the diametrical line 172 by a distance x. In the example shown, the distance x is substantially equal to the spacing between the facing surfaces 160 and 162 when the wear ring 140 is in the uncompressed state.

Additionally, in this embodiment, the intermediate portion 164 of the gap 150 is machined using angled cutting. As a result, each of the facing surfaces 166 and 168 is inclined relative to the axis of the wear ring 140, such that each of the facing surfaces 166 and 168 defines an angle (180°−θ) and θ, respectively, with a radial line 174 extending from the center axis of the wear ring 140, as may be seen in FIG. 17. Additionally, in the example shown, the intermediate portion 164 of the gap 150 is circumferentially angled, such that each of the facing surfaces 166 and 168 defines an angle φ with a tangential line 176 that is tangential to the circumference of the wear ring 140.

Figure 13:
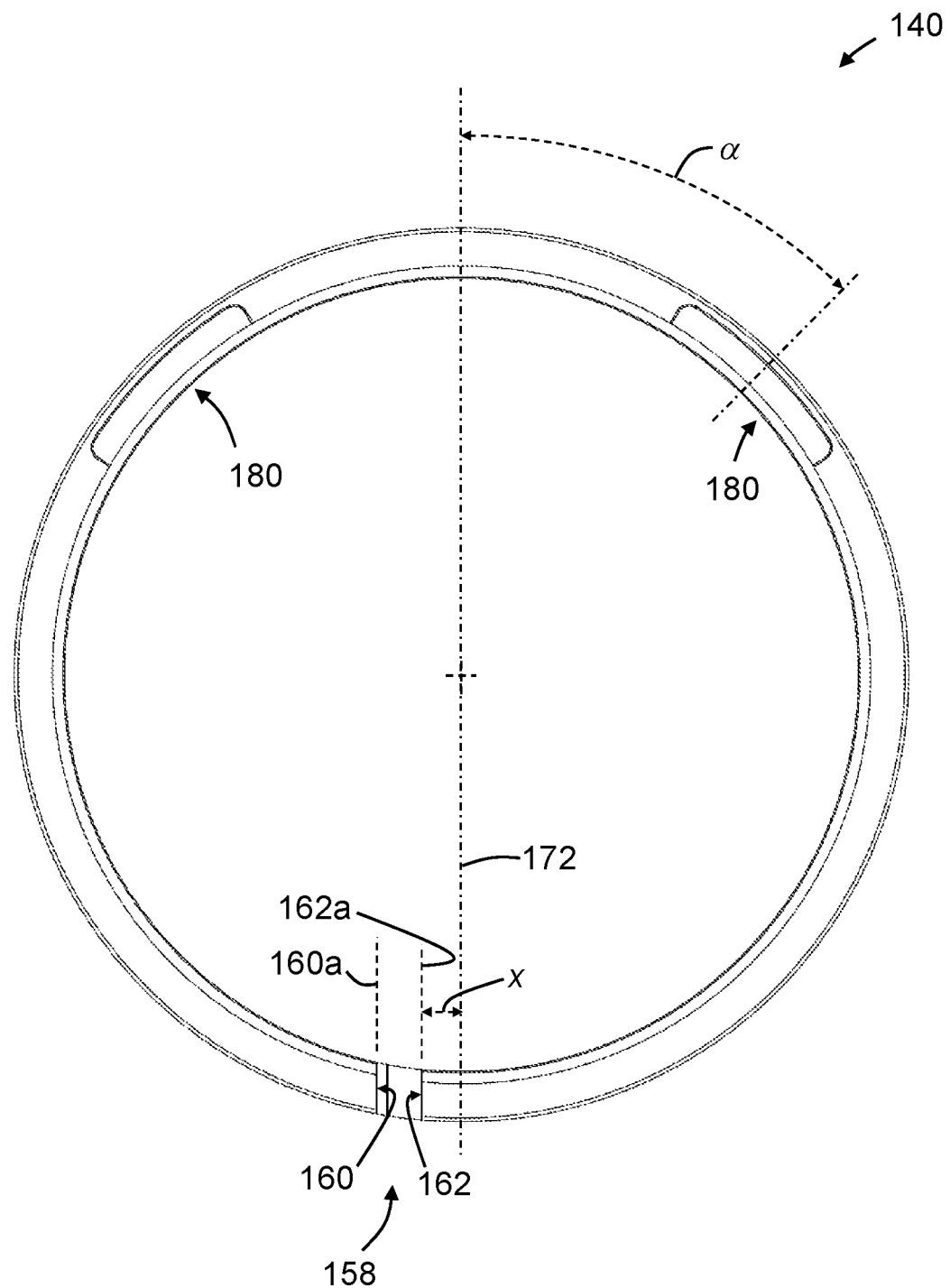
FIG. 13 is a rear view of the wear ring of FIG. 3.
Figure 14:
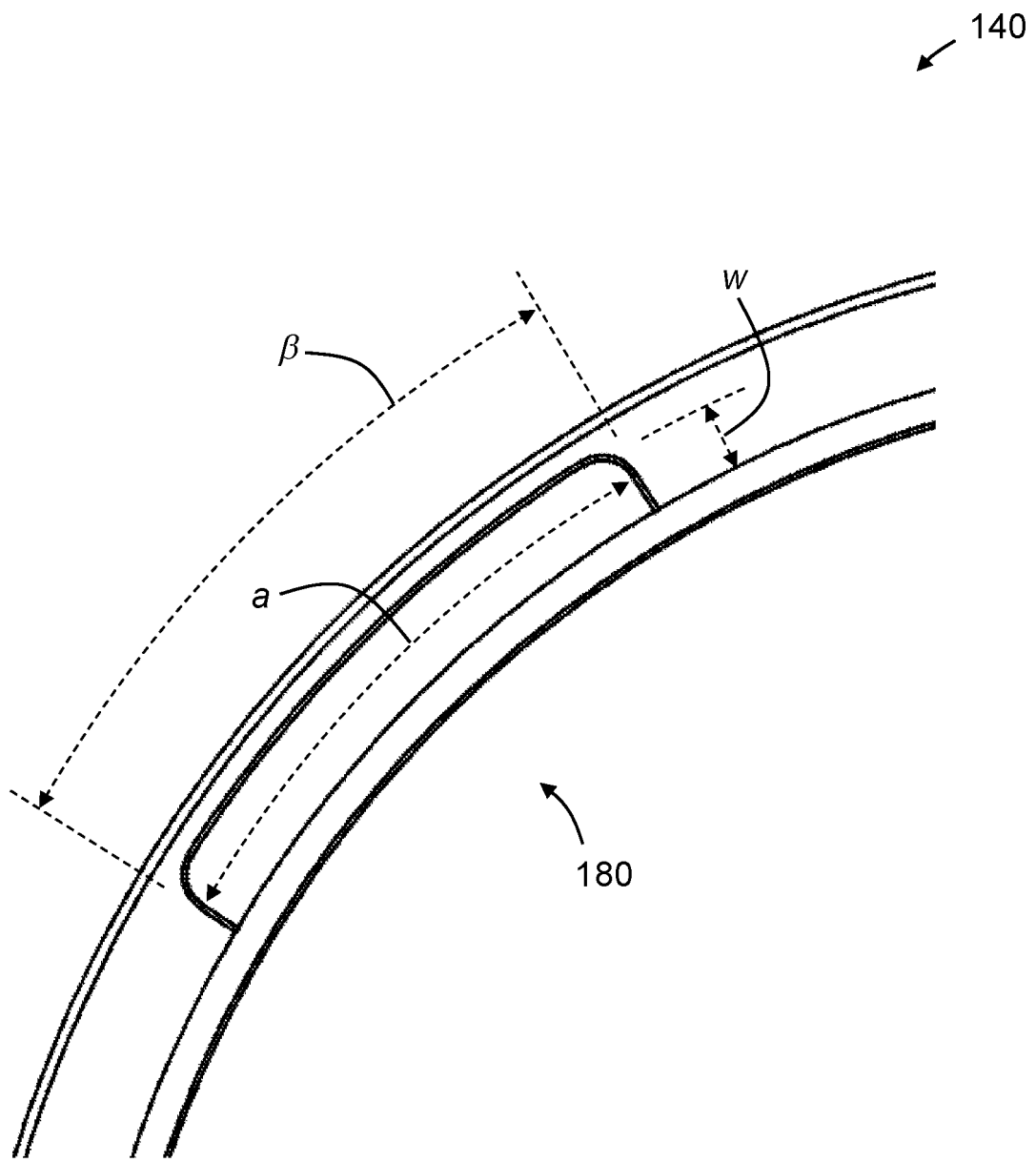
FIG. 14 is an enlarged view of a portion of the wear ring of FIG. 13.
Figure 15:
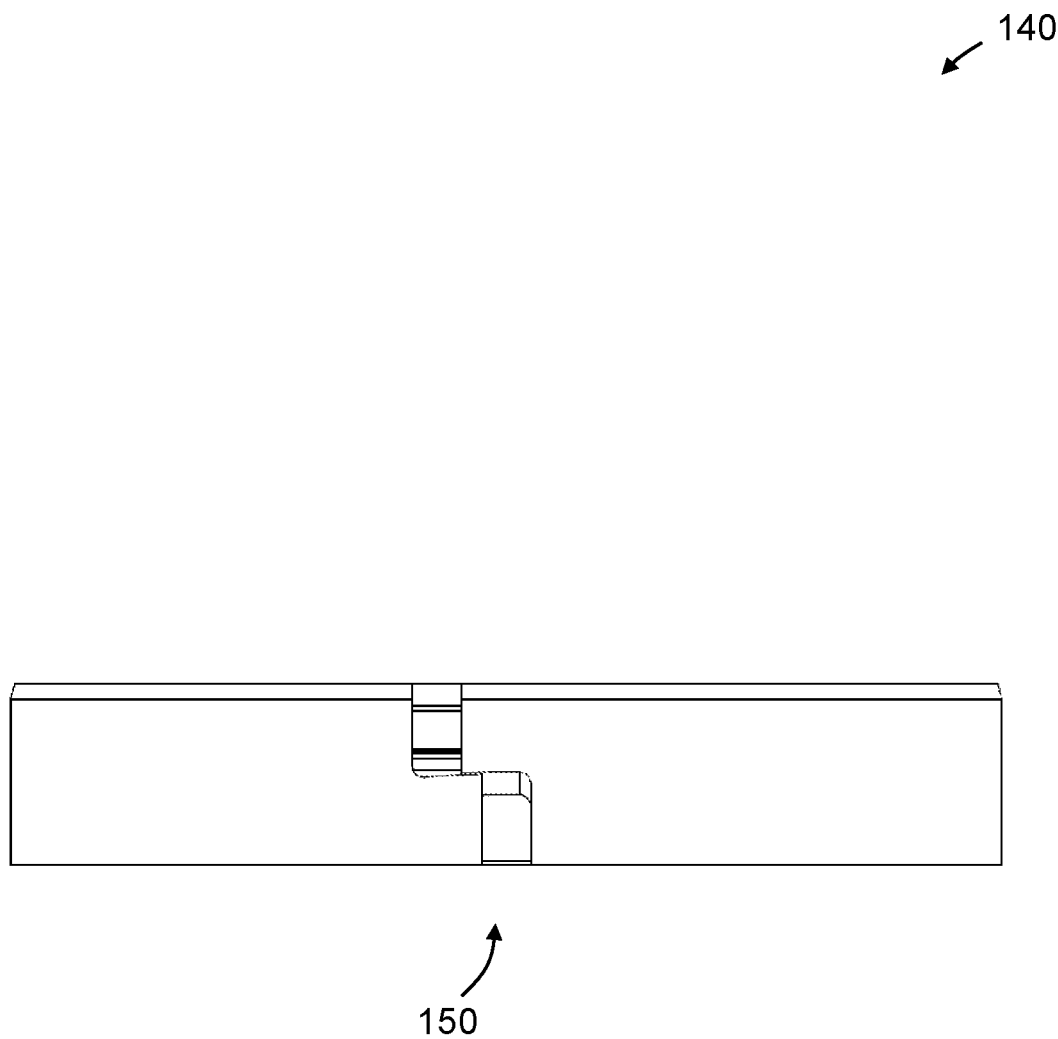
FIG. 15 is an elevation view of the wear ring of FIG. 3.
Figure 16:
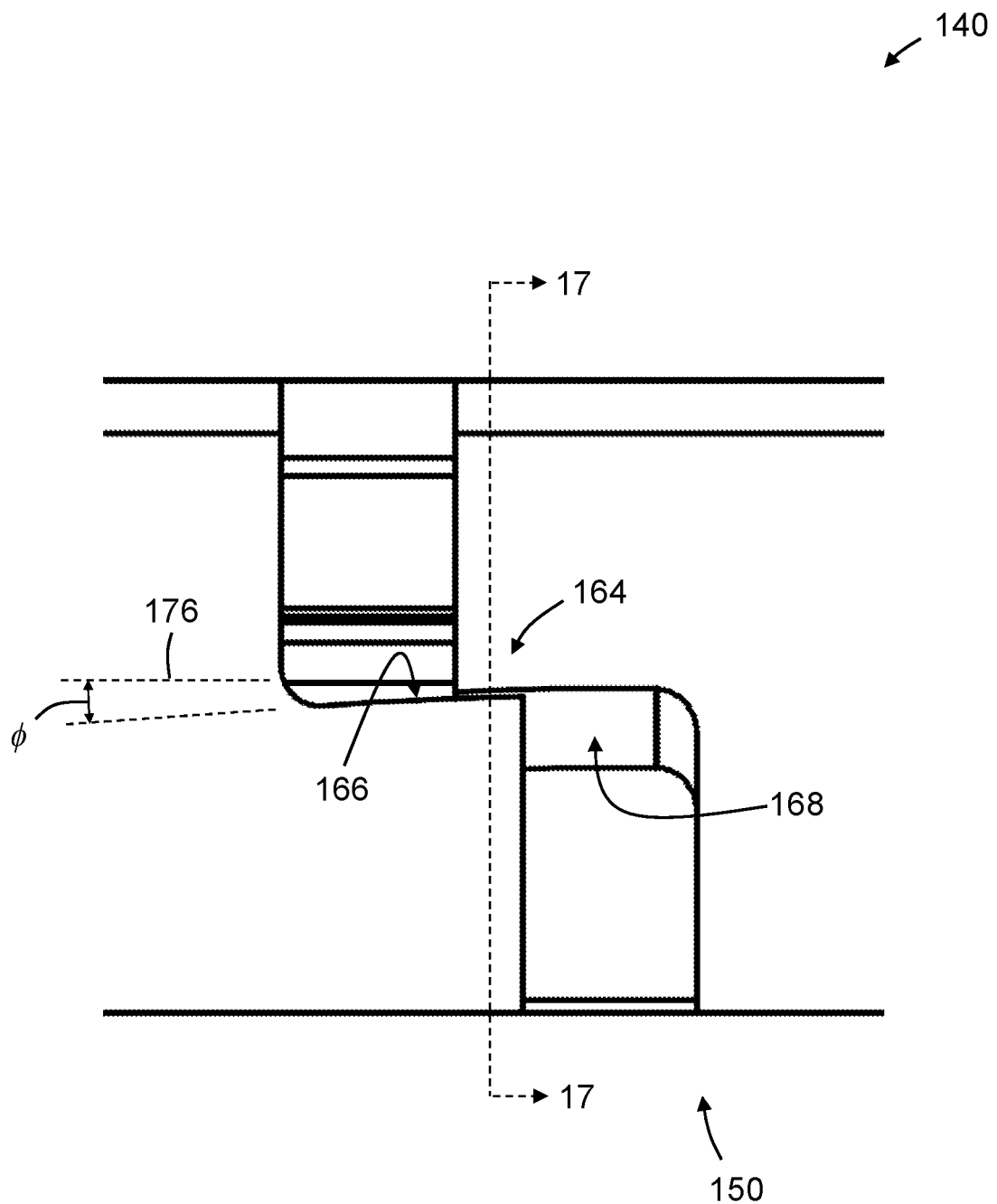
FIG. 16 is an enlarged view of a portion of the wear ring of FIG. 15.
Figure 17:
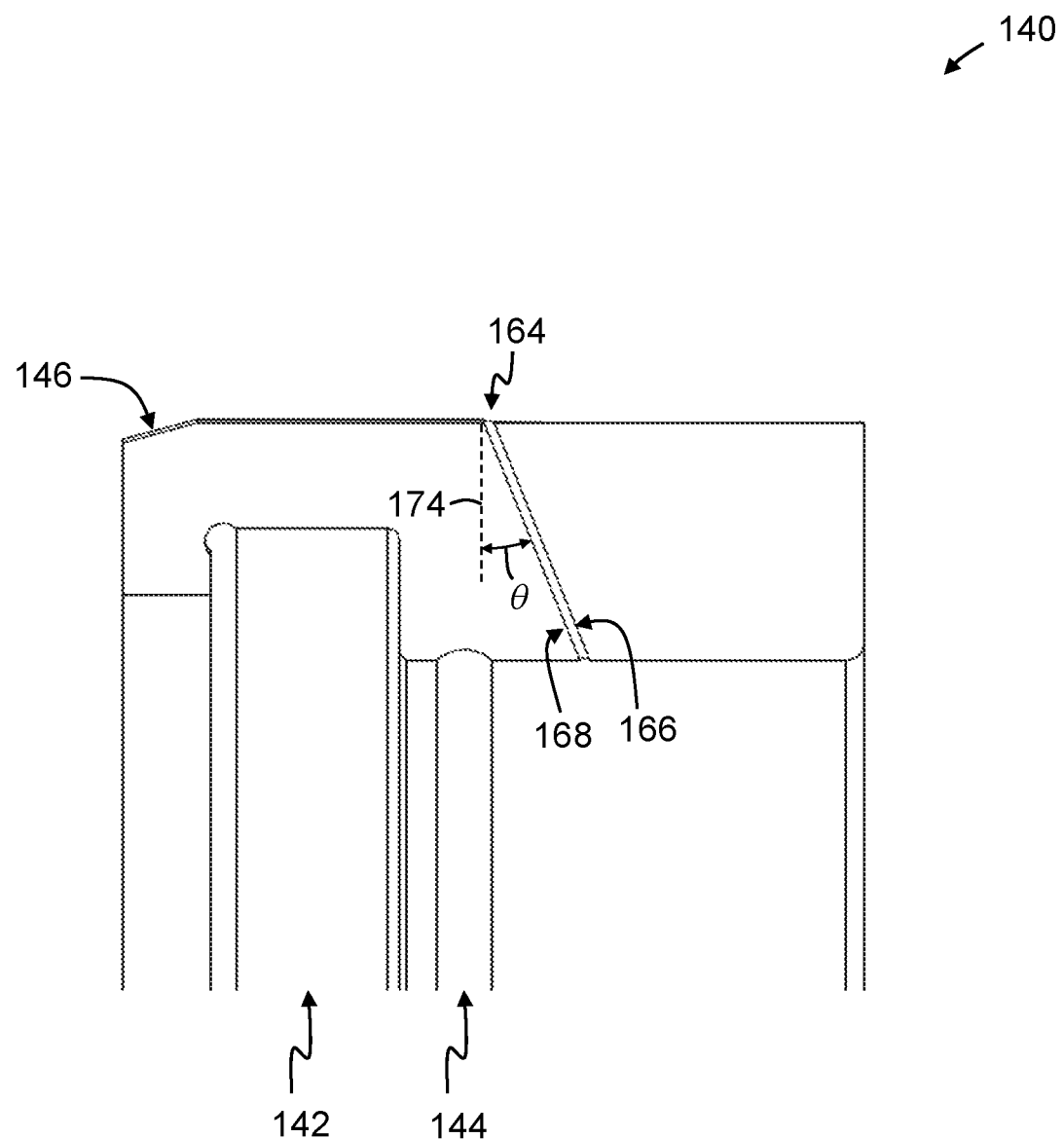
FIG. 17 is a sectional view of a portion of the wear ring of FIG. 16, taken along the indicated section line.

The wear ring 140 further comprises a rear axial end face 178, into which two (2) longitudinal, angularly-spaced, arc-shaped recesses 180 are machined. Each recess 180 is sized to accommodate the retainer pin 138 disposed in the upper bore 136 of the piston tip 130. Each recess 180 is centered on a position that is circumferentially offset from the diametrical line 172, which bisects the gap between the facing surfaces 154 and 156, by an angle α, as can be seen in FIG. 13. As will be understood, the circumferential offset of each recess 180 results in the gap 150 being positioned away from the bottom of the piston tip 130, and away from the surface of the piston bore 122 directly under the port 124, when the wear ring 140 is disposed on the piston tip 130.

Additionally, each recess 180 has an arc length a that subtends an angle β with the center of the wear ring 140. The arc length a is greater than a width w of the recess 180, and is also greater than the diameter d of the retainer pin 138. In the example shown, the arc length a of each recess 180 is about eight (8) times the width w of the recess 180, and about eight (8) times the diameter d of the retainer pin 138. Each recess 180 is bounded by two (2) end surfaces 184 and one (1) outer side surface 186, and has a longitudinal opening 188 along an inner side, which extends the arc length a, for allowing the retainer pin 138 to enter the recess 180 during installation of the wear ring 140 onto the piston tip 130. As will be understood, the longitudinal shape of recess 180 enables the wear ring 140 to circumferentially expand and compress during operation. Additionally, and as will be understood, the longitudinal shape of recess 180 enables the wear ring 140 to rotate freely around the piston tip 130 during operation along an arc A (not shown), where the length of the arc A is equal to the difference between the arc length a of the recess 180 in which the retainer pin 138 is accommodated, and the diameter d of the retainer pin 138, or A=(a−d).

During use, the wear ring 140 is installed onto the piston tip 130 by first inserting the retainer pin 138 into the upper bore 136, and then circumferentially expanding the wear ring 140 and aligning one (1) of the two (2) recesses 180 with the retainer pin 138, while fitting the inner circumferential groove 142 onto the circumferential rib 134. The piston having the piston tip 130 installed thereon is then inserted into the piston bore of the die-casting apparatus.

At the beginning of a stroke cycle, the piston is positioned at its starting position in the piston bore 122, and a volume of liquid metal is introduced into the piston bore 122 forward of the piston tip 130 via port 124. The piston is then moved forward through the piston bore 122 to push the volume of liquid metal into the mold cavity for forming a metal casting, and is then moved rearward to its starting position to complete the stroke cycle. During this movement, the wear ring 140 disposed on the piston tip 130 continuously contacts the inner surface 128 of the piston bore 122, and provides a liquid metal seal for preventing liquid metal from passing between the piston tip 130 and the inner surface 128 of the piston bore 122. The wear ring 140 also provides a vacuum seal for maintaining vacuum (that is, a low pressure) within the forward volume of the piston bore 122. The cycle is repeated, as desired, to produce multiple metal castings.

As will be appreciated, the circumferential offset of the recesses 180 relative to the gap 150 advantageously results in the gap being positioned away from the bottom of the piston tip 130, and therefore away from the surface of the piston bore 122 directly underneath the port 124. As will be understood, during operation, liquid metal introduced through the port 124 impacts the inner surface 128 the piston bore 122, and results in formation of a wear spot (not shown) having increased roughness. This roughness would otherwise cause edges of the gap 150 to catch and erode the surface of the piston bore 122, which would result in a poor seal to liquid metal and cause costly downtime of the die-casting apparatus 120.

As will be appreciated, the longitudinal shape of each arc-shaped recess 180 allows the wear ring 140 to circumferentially compress and expand during operation, as needed, in order to accommodate variations of the diameter of the piston bore 122 along the length of the piston bore 122. As will be understood, the range of circumferential compression and expansion permitted by the recess 180 is equal to the length of the arc A, where A=(a−d). Additionally, and as will be appreciated, the shape of each arc-shaped recess 180 allows the wear ring 140 to rotate freely around the piston tip 130 during use, as needed. As will be understood, the permitted range of rotation of the wear ring 140 is equal to the length of the arc A, where A=(a−d). This feature advantageously allows the wear ring 140 to automatically adjust to irregularities in the piston bore 122 during operation, and to thereby provide a better seal as compared to conventional wear rings.

As will be appreciated, the provision of two (2) recesses 180 allows an operator to choose from two (2) different orientations in which to install the wear ring 140 onto the piston tip 130. As will be understood, die-casting apparatuses are typically situated in their operating environments such that only one side of the piston is accessible to the operator. The provision of two (2) recesses 180 advantageously allows the operator to install the wear ring 140 onto the piston tip 130 from either a right side or a left side of the piston, and in an equally facile manner, in contrast with conventional wear rings comprising only a single semi-cylindrical notch.

As will be appreciated, the longitudinal shape of each arc-shaped recess 180 allows the wear ring 140 to be installed onto the piston tip 130 in a range of angular positions equal to the sum of the arc lengths a of both recesses 180, or 2a. This advantageously facilitates installation of the wear ring 140 by an operator, as compared to conventional wear rings comprising a single, narrow notch. Additionally, this advantageously allows the operator to selectively position the gap 150 away from any other known catching point on the inner surface 128 of the piston bore 122, additional to the wear spot underneath the port 124, in contrast with conventional wear rings.

Although in the embodiment described above, the wear ring comprises two (2) arc-shaped recesses, in other embodiments, the wear ring may alternatively comprise one (1) arc-shaped recess or more than two (2) arc-shaped recesses.

Although in the embodiment described above, the piston tip has a circumferential rib formed on an outer surface thereof, and the wear ring comprises an inner circumferential groove that is shaped to accommodate the circumferential rib, in other embodiments, other configurations may be alternatively used. For example, in one embodiment, the piston tip may alternatively comprise one or more receptacles, with each receptacle being configured to receive a tab protruding inwardly from an inner surface of the wear ring. As another example, in another embodiment the piston tip may alternatively have a plurality of projections formed on the outer surface thereof, and the wear ring may comprise a plurality of grooves or receptacles, with each groove or receptacle being configured to receive a projection.

Although in the embodiment described above, the gap comprises a first portion and a second portion, with each of the first and second portions extending in the axial direction and defining circumferentially spaced apart facing surfaces, in other embodiments, one or both of the first portion and the second portion may alternatively extend in a non-axial direction. For example, in one embodiment, one or both of the first portion and the second portion may alternatively define circumferentially spaced apart facing surfaces that define an angle with the axial direction.

Although in the embodiment described above, the gap comprises three (3) portions, namely a first portion and a second portion that are joined by an intermediate portion, in other embodiments, the gap may alternatively comprise a different number of portions. For example, although in the embodiment described above, the gap comprises a first portion and a second portion each extending in the axial direction and each defining circumferentially spaced apart facing surfaces, in other embodiments, the gap may alternatively comprise more than two portions each extending in the axial direction and each defining circumferentially spaced apart facing surfaces. In a related embodiment, the gap may further comprise more than one intermediate portion extending in the circumferential direction and defining facing surfaces, wherein adjacent portions that define circumferentially spaced, angled facing surfaces are joined by a respective intermediate portion.

Although in the embodiment described above, the gap is formed by electronic discharge machining (EDM) of an otherwise continuous ring, in other embodiments, the gap may alternatively be formed by another suitable method. In still other embodiments, the wear ring comprising the gap may alternatively be formed by casting.

Although in the embodiment described above, the wear ring is fabricated of DIN 1.2344 grade steel, in other embodiments, the wear ring may alternatively be fabricated of another grade of steel, such as for example DIN 1.2367 grade steel. In still other embodiments, the wear ring may alternatively be fabricated of any suitable tool steel, or of any other suitable material, such as for example a copper beryllium alloy.

The wear ring may be suitably sized so as to be mountable on a piston tip for use in piston bores having diameters ranging of from about 1 inch to about 10 inches.

Although in the embodiment described above, the piston tip and the wear ring are for use in a vacuum-assisted die-casting apparatus, it will be understood that the piston tip and the wear ring may alternatively be used in a non-vacuum assisted die-casting apparatus.

The following example illustrates an application of the above-described embodiment.

EXAMPLE

In this example, a wear ring shaped in accordance with the above-described embodiment, is configured to be mounted on a piston tip for use in a vacuum-assisted die-casting apparatus having a piston bore that has an inner diameter of about 4 inches. The wear ring is fabricated of DIN 1.2344 grade steel, and the gap in the wear ring is formed by electronic discharge machining. As machined, the wear ring has an outer diameter of about 4 inches, a smallest inside diameter of about 3.54 inches, and an axial length of about 0.79 inches.

The facing surfaces in the first portion of the gap are separated by a distance of about 0.25 inches, and the facing surfaces in the second portion of the gap are also separated by a distance of about 0.25 inches. The gap between the facing surfaces in the second portion is laterally offset from the radial line bisecting the first portion of the gap by a distance x of about 0.22 inches. Each of the facing surfaces of the intermediate portion of the gap defines an angle $\theta$ and (180°−$\theta$) of 22° and 158°, respectively, with a radial line extending from the center axis of the wear ring.

The wear ring has two (2) recesses, each having an arc length a of about 0.98 inches, and a width w of about 0.12 inches. Each recess is centered on a position that is circumferentially offset from the diametrical line bisecting the first portion of the gap by an angle $\alpha$ of about 45°. Additionally, each recess has an arc length a of about 0.98 inches, and subtends an angle $\beta$ of about 26° with the center of the wear ring.

Although embodiments have been described above with reference to the accompanying drawings, those of skill in the art will appreciate that variations and modifications may be made without departing from the scope thereof as defined by the appended claims.

What is claimed is:

1. A wear ring for a piston of a die-casting apparatus, the wear ring comprising:
    an annular body having a gap extending therethrough, the gap being configured to define at least two circumferentially offset pairs of circumferentially spaced apart facing surfaces,
    the annular body comprising an axial end face having at least one arc-shaped recess formed therein, wherein the at least one recess has a center that is circumferentially offset from a diametrical line that bisects the gap between one of the pairs of facing surfaces.

2. The wear ring of claim 1, wherein the center of the at least one recess is circumferentially offset from the diametrical line by an angle of between about 30 degrees and about 60 degrees.

3. The wear ring of claim 1, wherein the at least one recess has an arc length and a width, the arc length being greater than the width.

4. The wear ring of claim 3, wherein the at least one recess has an arc length that subtends an angle, at the center of the wear ring, of between about 20 and about 40 degrees.

5. The wear ring of claim 1, wherein the at least one recess has a longitudinal opening along an inner side.

6. The wear ring of claim 1, wherein one of the facing surfaces of each pair is parallel to a diametrical line that bisects the gap between one of the pairs of facing surfaces.

7. The wear ring of claim 1, wherein both of the facing surfaces of each pair are parallel to a diametrical line that bisects the gap between one of the pairs of facing surfaces.

8. The wear ring of claim 1, wherein the gap between a first pair of facing surfaces is laterally offset by a distance from a diametrical line that bisects the gap between a second pair of facing surfaces.

9. The wear ring of claim 8, wherein the distance is substantially equal to the gap between the second pair of facing surfaces, when the wear ring is in an uncompressed state.

10. The wear ring of claim 1, wherein the gap comprises a first portion and a second portion defining the at least two circumferentially offset pairs of circumferentially spaced apart facing surfaces, and wherein the gap further comprises an intermediate portion extending generally in the circumferential direction and joining the first portion and the second portion.

11. The wear ring of claim 10, wherein the intermediate portion defines a pair of additional facing surfaces, each of the additional facing surfaces being inclined and defining an angle with a radial line touching the intermediate portion.

12. The wear ring of claim 11, wherein the angle is between about 5 and about 40 degrees.

13. The wear ring of claim 10, wherein the intermediate portion defines a pair of additional facing surfaces, each of the additional facing surfaces defining an angle with a line that is tangential to the circumference of the wear ring.

14. The wear ring of claim 13, wherein the angle is between about 0.1 and 10 degrees.

15. A piston of a die-casting apparatus, the piston comprising:
    a piston tip configured to push liquid metal through a piston bore; and
    a wear ring disposed on an outer surface of the piston tip, the wear ring comprising an annular body having a gap extending therethrough, the gap being configured to define at least two circumferentially offset pairs of circumferentially spaced apart facing surfaces, the annular body comprising an axial end face having at least one arc-shaped recess formed therein, wherein the at least one recess has a center that is circumferentially offset from a diametrical line that bisects the gap between one of the pairs of facing surfaces.

16. The piston of claim 15, wherein the at least one recess is configured to accommodate a projection extending from the piston tip.

17. The piston of claim 16, wherein the projection is a retainer pin.

18. The piston of claim 15, wherein the at least one recess has an arc length and a width, the arc length being greater than the width.

19. A die-casting apparatus comprising the piston of claim 15.

20. The die-casting apparatus of claim 19, wherein the die-casting apparatus is a vacuum-assisted die-casting apparatus.

* * * * *